United States Patent
Daus et al.

(10) Patent No.: US 6,780,827 B1
(45) Date of Patent: Aug. 24, 2004

(54) AQUEOUS COMPOSITIONS OF UV-ACTIVE AGENTS, THEIR PRODUCTION AND USE

(75) Inventors: Rainer Daus, Lörrach (DE); Roland Grimm, Bubendorf (CH); Jürg Heller, Oberwil (CH); Jean-Luc Mura, Rixheim (FR)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/763,929

(22) PCT Filed: Aug. 24, 1999

(86) PCT No.: PCT/IB99/01467

§ 371 (c)(1),
(2), (4) Date: Feb. 26, 2001

(87) PCT Pub. No.: WO00/11257

PCT Pub. Date: Mar. 2, 2000

(30) Foreign Application Priority Data

Aug. 25, 1998 (EP) ............................................. 98810840
Jun. 1, 1999 (EP) ............................................. 99810474

(51) Int. Cl.$^7$ .............................. C11D 3/42; C11D 3/37
(52) U.S. Cl. ..................... 510/394; 510/276; 510/287; 510/398; 510/434; 8/115.51; 8/115.53
(58) Field of Search ................................ 510/276, 287, 510/394, 398, 434; 8/115.51, 115.53

(56) References Cited

U.S. PATENT DOCUMENTS

| 4,215,004 A | * | 7/1980 | Borgerding et al. | ......... 252/156 |
| 4,556,504 A | * | 12/1985 | Rek | ............................ 252/135 |
| 4,699,779 A | * | 10/1987 | Palinczar | ...................... 424/59 |
| 5,243,021 A | * | 9/1993 | Langer et al. | ............... 528/272 |
| 5,597,574 A | * | 1/1997 | Narayanan et al. | .......... 424/401 |
| 5,731,450 A | * | 3/1998 | Alexander et al. | ........... 554/221 |
| 5,736,128 A | * | 4/1998 | Chaudhuri et al. | ....... 424/78.03 |
| 5,945,093 A | * | 8/1999 | Duvel | ..................... 424/70.12 |

* cited by examiner

Primary Examiner—Charles Boyer
(74) Attorney, Agent, or Firm—Scott E. Hanf; Anthony A. Bisulca

(57) ABSTRACT

Aqueous dispersions (U) containing:
  (A) a UV-light-absorbing textile treatment agent,
  (B) a dispersant system and
  (C) a carboxyl-containing crosslinked copolymer, and optionally
  (D) at least one formulation additive,
are useful for the corresponding UV-active finishing of textile material, in particular textile material which can be dyed with disperse dyes or optically brightened with disperse brighteners, especially for treating cheeses with liquors comprising disperse dyes and UV absorbers or liquors comprising disperse brighteners, without fear of troublesome pressure build-up or dye or brightener deposits.

11 Claims, No Drawings

AQUEOUS COMPOSITIONS OF UV-ACTIVE AGENTS, THEIR PRODUCTION AND USE

Textile material which is used in an environment in which ultraviolet (UV) light acts on the textile material, especially UV light filtering through glass, as for the interior fittings in automobiles (carpets, belts, trim and seat covers), shop windows or glass-enclosed verandas (wall-to-wall carpets), are advantageously finished with a UV absorber in order that the fibres, especially synthetic and cellulosic fibres, and the dyeings too to some extent, may be protected against the damaging action of the UV rays. A preferred procedure for textile material used in an environment of filtered UV light involves applying the UV absorbers to the substrate, in particular to the yarns, together with the respective dyes. Since the yarns, according to a technically preferred procedure, are dyed on packages, in particular cheeses, in doing so it is also desirable to apply the UV absorbers at the same time. However, when dyeing the packages with disperse dyes, a problem is that, in the presence of UV absorbers which have been formulated with surfactants, the liquors may, under the action of the high shearing forces which occur in the cheese, alter to such an extent that the dyeings of the cheeses become unlevel, in particular due to the dye being filtered off, so that the yarn when further processed, for example into knits or wovens, provides an unlevel appearance, or/and, if the dispersions change in their flow behaviour under the action of the high shearing forces, the liquor flow through the cheeses may gradually lead to a troublesome build-up of pressure, which—especially depending on yarn quality and type of wind—leads to correspondingly more pronounced changes in the shearing forces in the package and may even lead to a complete standstill of the flow of liquor through the package. The situation can be analogous with the use of dispersed optical brighteners.

EP-A-468921, 474595 and 490819 describe certain aqueous UV-absorber dispersions containing UV-absorbers and anionic surface active compounds or non-ionogenic and anionic surface active compounds and also such dispersions additionally containing polysaccharides or further linear polymeric compounds as stabilisers and/or thickening agents. EP-A-328485 describes aqueous dispersions of certain dyes, optical brighteners or UV-absorbers containing, besides dispersant, an alkylene-bisamide defoamer and in some examples also certain linear polymers (polyvinyl alcohol or a propyleneoxide/ethyleneoxide 3000 blockpolymer) or a polysaccharide.

It has now been found, surprisingly, that by employing the hereinbelow-defined (C)-containing formulations the above-described problems may be solved or avoided, so that it becomes possible as a result also to treat cheeses with disperse dyes and UV absorber liquors or with disperse brightener liquors without fear of a troublesome pressure build-up or dye or brightener filtration deposits.

The invention relates to the defined compositions, their production and their use.

The invention thus firstly provides aqueous dispersions (U) containing:
(A) a UV-light-absorbing textile treatment agent,
(B) a dispersant system and
(C) a carboxyl-containing crosslinked copolymer.

The UV-light-absorbing textile treatment agents (A) are UV-active agents, i.e. their fundamental property is the absorbing of UV light, whether to convert it into visible wavelengths, as in the case of optical brighteners, or to convert it into other energy forms or other wavelengths, as is the case with typical UV absorbers. Thus, the UV-active agents (A) are in particular
($A_1$) UV absorbers or
($A_2$) optical brighteners.

Suitable UV absorbers ($A_1$) include generally known substances as are usually employed for the UV-light-absorbing finishing of synthetic and semisynthetic textile fibres from an aqueous dispersion, chiefly those of the benzophenone, triazine or benzotriazole series, in particular phenols which bear a substituent of the triazine, benzoyl or benzotriazole series in ortho-position relative to the hydroxyl group and which may bear further substituents, in particular non-chromophoric and non-water-solublilizing substituents.

Suitable UV absorbers of the benzophenone series include generally 2-hydroxybenzophenones in which the two benzene rings may optionally be substituted with substituents customary in UV absorbers, in particular non-chromophoric and non-water-solubilizing substituents, for example with hydroxyl, alkyl, alkoxy, aryl, aryloxy, aralkoxy or halogen, aryl (in aryl, aryloxy and aralkoxy) being naphthyl or preferably phenyl, the alkyl and alkoxy radicals containing for example 1 to 4 carbon atoms, phenyl as aryl optionally being further substituted with alkyl, halogen and/or alkoxy, and halogen signifying preferably chlorine, and the alkoxy bridge in aralkoxy containing e.g. 1 or 2 carbon atoms. There may be mentioned as examples 2-hydroxybenzophenones of the following formulae

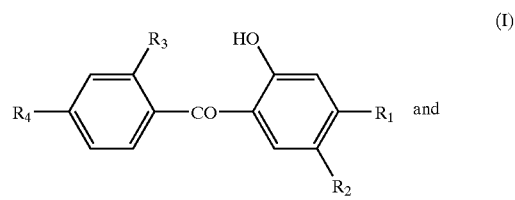

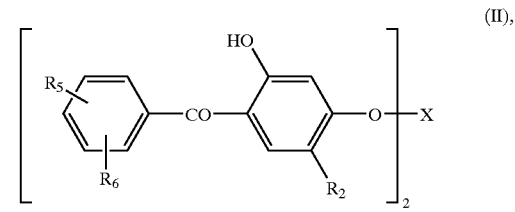

wherein
$R_1$ signifies hydrogen, hydroxyl, phenoxy, aralkoxy or $C_{1-14}$-alkoxy,
$R_2$ signifies hydrogen, halogen or $C_{1-4}$-alkyl,
$R_3$ signifies hydrogen or hydroxyl,
$R_4$ signifies hydrogen, hydroxyl, phenoxy, aralkoxy or $C_{1-4}$-alkoxy,
$R_5$ signifies hydrogen or $C_{1-4}$-alkyl,
$R_6$ signifies hydrogen or $C_{1-4}$-alkyl and
X signifies a hydrocarbon bridge member having 2 to 12 carbon atoms or hydroxyalkylene.

In the compounds of the formula (I), $R_2$, $R_3$ and $R_4$ stand each preferably for hydrogen. $R_1$ stands preferably for hydrogen, hydroxyl, phenoxy or $C_{1-14}$-alkoxy.

In the formula (II), the two substituents $R_5$ and $R_6$ are advantageously in the positions ortho and para to the carbonyl group. Preferably, $R_5$ and also $R_6$ signify hydrogen. When X stands for hydroxyalkylene, it advantageously contains at least 3 carbon atoms and the hydroxyl group is advantageously not attached to the first or last carbon atom of the bridge. X may e.g. stand for 1,4-phenylene, 1,4-naphthylene or $C_{2-4}$-alkylene or also for 2-hydroxy-1,3-propylene.

The following may be mentioned in particular:
2-hydroxy-4-methoxybenzophenone,
2,4-dihydroxybenzophenone,
2-hydroxy-5-chlorobenzophenone,
1,3-bis-(3'-hydroxy-4'-benzoylphenyl)-2-hydroxypropane.

Suitable UV absorbers of the triazine series include in general 2-(2'-hydroxyphenyl)-s-triazines in which the positions 4 and 6 are substituted by hydrocarbon radicals which in turn may be further substituted, in which case the substituents are neither chromophoric nor water-solubilizing. The hydrocarbon radicals in 4-position and in 6-position arm for example aryl, alkyl or aralkyl, aryl standing e.g. for naphthyl or preferably phenyl, aralkyl preferably standing for benzyl and alkyl containing e.g. 1 to 18 carbon atoms. The substituents occurring on phenyl rings are for example hydroxyl, halogen, low molecular weight alkyl, alkoxy or alkylthio, and the substituents occurring on the alkyl radicals are e.g. hydroxyl, low molecular weight alkoxy, alkylthio or dialkylamino. There may be mentioned for example the 2-(2'-hydroxyphenyl)-s-triazines of the following formula

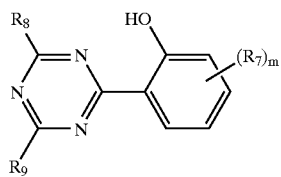

(III)

wherein
$R_7$ signifies hydroxyl, halogen, $C_{1-4}$-alkyl or $C_{1-4}$-alkoxy,
$R_8$ signifies $C_{1-18}$-alkyl, which is optionally substituted with hydroxyl, halogen, $C_{1-4}$-alkoxy, $C_{1-4}$-alkylthio or di-($C_{1-4}$-alkyl)-amino, or phenyl, which is optionally substituted with hydroxyl, halogen, $C_{1-4}$-alkyl or $C_{1-4}$-alkoxy,
$R_9$ signifies $C_{1-18}$-alkyl, which is optionally substituted with hydroxyl, halogen, $C_{1-4}$-alkoxy, $C_{1-4}$-alkylthio or di-($C_{1-4}$-alkyl)-amino, or phenyl, which is optionally substituted with hydroxyl, halogen, $C_{1-4}$-alkyl or $C_{1-4}$-alkoxy, and
m signifies 0, 1 or 2.

The alkyl radicals which occur may be linear or, if they contain three or more carbon atoms, may also be branched or, if they contain six or more carbon atoms, may also be cyclic.

$R_7$ stands preferably for chlorine or $C_{1-4}$-alkyl. When m signifies 2, the two $R_7$ substituents may have equal or different significances, in which latter case it is preferable for the second $R_7$ to signify methyl.

When m signifies 1 or 2, one $R_7$ is preferably in para-position relative to the 2-positioned hydroxyl group.

There may be mentioned by way of example:
2-(2'-hydroxyphenyl)-s-triazine in which $R_8$ and $R_9$ have the same significance and signify each propyl or t.butyl,
4,6-dimethyl-2-(2'-hydroxy-5'-chloro-, -methyl- or -t.butyl-phenyl)-s-triazine,
4,6-dimethyl-2-(2'-hydroxy4',5'- or -3',5'-dimethylphenyl)-s-triazine,
4,6-diethyl-2-(2'-hydroxy4',5'-dimethylphenyl)-s-triazine,
4,6-diphenyl-2-(2'-hydroxy-4'-methoxy-, -ethoxy- or -isopropyl-phenyl)-s-triazine.

Suitable UV absorbers of the benzotriazole series include generally 2-(2'-hydroxyphenyl)-benzotriazoles wherein the two benzene rings may optionally be substituted in particular with substituents customary in UV absorbers, in particular non-chromophoric and non-water-solubilizing substituents, for example hydroxyl, alkyl, alkoxy, aryl, aralkyl, alkylaryl, alkoxycarbonyl or halogen, aryl signifying naphthyl or preferably phenyl, the alkyl radicals containing for example from 1 to 12 carbon atoms, the alkoxy radicals containing for example from 1 to 4 carbon atoms, phenyl as aryl being optionally further substituted with halogen, $C_{1-4}$-alkyl and/or $C_{1-4}$-alkoxy and halogen standing preferably for chlorine. There may be mentioned for example 2-(2'-hydroxyphenyl)-benzotriazoles of the following formula

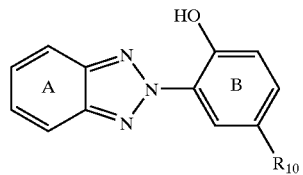

(IV), wherein
$R_{10}$ signifies $C_{1-12}$-alkyl, $C_{1-5}$-alkoxy, aryl, aralkyl, ($C_{1-12}$-alkyl)-aryl, ($C_{1-5}$-alkoxy)-carbonyl or halogen
and the rings A and B are each optionally substituted with one or more of the substituents hydroxyl, $C_{1-5}$-alkyl, $C_{1-5}$-alkoxy, $C_{1-5}$-alkoxycarbonyl or halogen, and B may also bear a $C_{1-12}$-alkyl radical in ortho position to the hydroxyl group.

The alkyl radicals which occur may be linear or, if they contain three or more carbon atoms, may also be branched or, if they contain six or more carbon atoms, may also be cyclic. Aralkyl stands preferably for benzyl. Halogen stands preferably for chlorine. In the ring B, the position 6 is preferably unsubstituted; in the benzotriazole ring, the positions 4 and 7 are preferably unsubstituted.

Preferred UV absorbers of the benzotriazole series conform to the formula

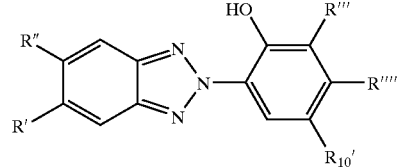

(IVa), wherein
R' signifies hydrogen, $C_{1-5}$-alkyl, $C_{1-5}$-alkoxy, ($C_{1-5}$-alkoxy)-carbonyl or chlorine,
R" signifies hydrogen or chlorine,
R'" signifies hydrogen, $C_{1-12}$-alkyl, phenyl, ($C_{1-5}$-alkyl)-phenyl, benzyl or chlorine,
R"" signifies hydrogen, hydroxyl, $C_{1-5}$-alkyl, $C_{1-5}$-alkoxy or chlorine, and
$R_{10}'$ signifies $C_{1-12}$-alkyl, $C_{1-5}$-alkoxy, phenyl, ($C_{1-5}$-alkyl)-phenyl, benzyl, ($C_{1-5}$-alkoxy)-carbonyl or chlorine, especially to the formula

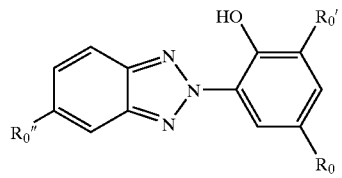

(IVb), wherein
- $R_0$ signifies $C_{1-5}$-alkyl, $C_{1-5}$-alkoxy or chlorine, preferably $C_{1-5}$-alkyl,
- $R_0'$ signifies hydrogen, chlorine, $C_{1-5}$-alkyl or $C_{1-5}$-alkoxy, preferably hydrogen or $C_{1-5}$-alkyl, and
- $R_0''$ signifies hydrogen, chlorine, $C_{1-5}$-alkyl or $C_{1-5}$-alkoxy, preferably hydrogen, chlorine or methyl.

There may be mentioned by way of example:
2-(2'-hydroxy-5'-methylphenyl)-benzotriazole,
2-(2'-hydroxy-3',5'-dimethylphenyl)-benzotriazole,
2-(2'-hydroxy-5'-t.butylphenyl)-benzotriazole,
2-(2'-hydroxy-3'-t.butyl-5'-methylphenyl)-5-chlorobenzotriazole,
2-(2'-hydroxy-3',5'-di-t.butylphenyl)-benzotriazole,
2-(2'-hydroxy-3',5'-di-t.butylphenyl)-5-chlorotriazole,
2'-(2'-hydroxy-3',5'-di-t-amylphenyl)-benzotriazole.

Useful optical brighteners ($A_2$) are generally known substances of the type usually employed for the optical brightening of synthetic and cellulosic textile fibres from an aqueous dispersion, in particular those of the coumarin, naphthalimide, benzoxazole, stilbene, bisstyrylbenzene, thiophene or pyrene series and which may bear any substituents usual in optical brighteners, especially non-chromophoric and non-water-solubilizing substituents.

Suitable optical brighteners ($A_2$) are for example those of the following formulae (V) to (XI)

(V),

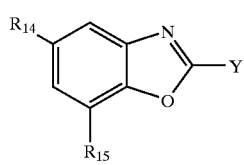

wherein
- $R_{11}$ signifies $C_{1-4}$-alkyl,
- $R_{12}$ signifies $C_{1-4}$-alkyl and
- $R_{13}$ signifies hydrogen or $C_{1-4}$-alkoxy,

[VI], wherein
- $R_{14}$ signifies hydrogen, chlorine or $C_{1-4}$-alkyl,
- $R_{15}$ signifies hydrogen or $C_{1-4}$-alkyl, Y signifies a radical of the formula

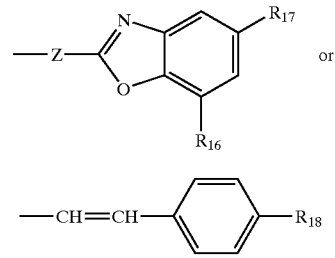

(a)

or (b),

—CH=CH—⟨⟩—$R_{18}$

- $R_{16}$ signifies hydrogen or $C_{1-4}$-alkyl,
- $R_{17}$ signifies hydrogen, chlorine or $C_{1-4}$-alkyl,
- $R_{18}$ signifies —CN, ($C_{1-4}$-alkoxy)-carbonyl, phenyl or a radical of the formula

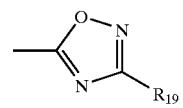

(c),

- $R_{19}$ signifies $C_{1-4}$-alkyl and
- Z signifies —CH=CH—, 3,4-thiophenylene or 1,4-naphthylene,

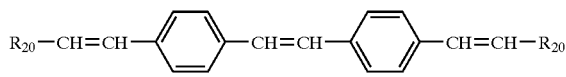

(VII), wherein
- $R_{20}$ signifies —CN or ($C_{1-4}$-alkoxy)-carbonyl,

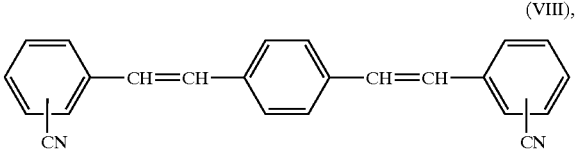

(VIII),

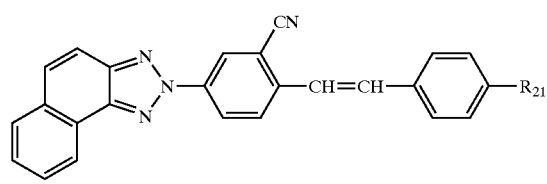

(IX), wherein
- $R_{21}$ signifies hydrogen, chlorine, —CN or $C_{1-4}$-alkyl, (X), wherein
- $R_{22}$ signifies 1-pyrazolyl which is substituted with chlorine or $C_{1-4}$-alkyl in position 3 or 4, or signifies phenyl and $R_{23}$ signifies 2-triazolyl or 1-pyrazolyl which are substituted with $C_{1-4}$-alkyl and/or phenyl, or signifies 2-naphthotriazolyl, and

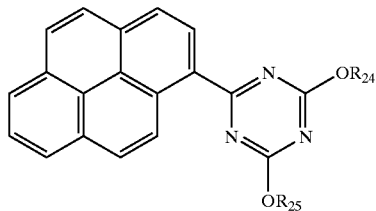
(XI), wherein $R_{24}$ signifies $C_{1-4}$-alkyl and $R_{25}$ signifies $C_{1-4}$-alkyl.

The dispersant system (B) is used for dispersing the UV-active textile treatment agents (A) in water and consequently contains appropriate, suitable surfactants and optionally suitable auxiliaries. (B) thus expediently consists of ($B_1$) at least one surfactant and optionally ($B_2$) at least one dispersing auxiliary.

The surfactants ($B_1$) are surfactants suitable for dispersing (A) in water and they consequently have dispersant characteristics; they include inter alia also such surfactants as are known in the art also as emulsifiers. Advantageously as ($B_1$) there are employed ($B_{11}$) anionic dispersants and/or ($B_{12}$) non-ionogenic dispersants.

As ($B_{11}$) there may be employed any anion-active surfactants having dispersant or emulsifier properties, in particular compounds of distinctly anionic character which contain at least one lipophilic radical, in particular at least one lipophilic hydrocarbon radical, and at least one distinctly anionic group (sulpho group, phosphoric acid group or carboxyl group), the lipophilic hydrocarbon radical advantageously containing at least 9 carbon atoms, for example 9 to 30 carbon atoms. The following may be mentioned by way of example:

condensation products of formaldehyde with sulphonated aromatic compounds (for example sulphonated naphthalene, mono- or di-($C_{1-4}$-alkyl)-naphthalene, biphenyl, diphenyl ether, ditolyl ether, phenol, $C_{1-4}$-alkylphenol and/or corresponding sulphones) and/or with ligninsulphonate, optionally in a mixture with dihydroxydiphenyl sulphone;

ligninsulphonates;

$C_{12-24}$-alkyl sulphonates;

sulphonation products of paraffins (prepared for example by sulphochlorination or sulphoxidation), of α-olefins, of alkylbenzenes and of unsaturated fatty acids;

$C_{12-24}$-fatty acid salts;

esterification products of non-ionogenic surfactants as described below, in particular of oligoethylene glycol ethers of fatty alcohols, alkylphenols or di- or tristyrylphenols, with sulphuric acid, phosphoric acid or aminosulphonic acid, or alkylation products of the mentioned non-ionogenic surfactants with chloroacetic acid or chloropropionic acid, to form the corresponding esters or carboxymethylated or carboxyethylated products.

The anionic surfactants are advantageously present, at least partly, in the form of salts, chiefly in the form of alkali metal salts (preferably sodium or potassium salts) or ammonium salts. It is possible to use single compounds or also mixtures of compounds, including especially technical grade mixtures.

As non-ionogenic surfactants ($B_{12}$) there may be employed those which act directly as emulsifiers or dispersants or also which are employed as cosurfactants to ($B_{11}$). Generally known substances are suitable, principally those containing 9 to 30, preferably 12 to 24, carbon atoms in the lipophilic moiety, or also those having an oligomeric or polymeric basic structure, and whose hydrophilic moieties contain ethylene glycol radicals, glycerol radicals and/or sorbitan radicals. As examples there may be mentioned:

adducts of ethylene oxide to fatty alcohols, alkylphenols, di- or tristyrylphenols, novolaks or fatty acid N,N-diethanolamide or diisopropanolamide; fatty acid monoesters of polyethylene glycols. Polypropylene glycol chains may occasionally also occur in the molecule as lipophilic radicals, and accordingly the non-ionogenic surfactants used can also comprise block copolymers which contain propyleneoxy and ethyleneoxy units, and also optionally styreneoxy and/or butyleneoxy units (for example those known under the designation "Pluronic"). The non-ionogenic surfactants are advantageously selected such that they can display an adequate dispersing action on (A). The HLB value of the non-ionogenic surfactants is advantageously >10, preferably in the range from 12 to 18, while those having an HLB value >15, preferably $\geq 16$, may also be used as protective colloids.

As dispersants there may e.g. be employed ($B_{11}$) alone [i.e. without ($B_{12}$)] or ($B_{12}$) alone [i.e. without ($B_{11}$)] or mixtures of ($B_{11}$) and ($B_{12}$). Preferably at least one non-ionogenic surfactant ($B_{12}$) is employed either as dispersant or, when ($B_{11}$) is used as dispersant, also as cosurfactant to ($B_{11}$). In this the weight ratio of ($B_{11}$) to ($B_{12}$) is e.g. in the range from 30/70 to 95/5, preferably 40/60 to 90/10. To disperse (A) in water, a suitable amount of ($B_1$) is advantageously selected, which may vary according to the kind of the components and their concentration. The weight ratio of the total dispersants ($B_1$) to (A), i.e. of [($B_{11}$)+($B_{12}$)] to (A), is advantageously in the range from 5/100 to 150/100, preferably 6/100 to 80/100, particularly preferably 10/100 to 70/100. When ($B_{12}$) is used as cosurfactant to ($B_{11}$), the weight ratio of ($B_{12}$)/($B_{11}$) is advantageously 1/100 to 40/100, preferably 5/100 to 20/100.

Preferably, ($B_1$) includes at least one polymeric surfactant, especially at least one of the mentioned condensation products of formaldehyde with sulphonated aromatic compounds or at least one of the mentioned block copolymers which contain propyleneoxy and ethyleneoxy units and optionally also styreneoxy and/or butyleneoxy units.

Dispersing auxiliaries ($B_2$) may be employed in addition in order that the dispersing effect of ($B_1$) may be sustained and/or the appearance of the dispersion improved.

As ($B_2$) there are particularly worth mentioning:

($B_{21}$) protective colloids, ($B_{22}$) wetting agents ($B_{23}$) solubilizers and/or ($B_{24}$) dispersion stabilizers If desired, polymeric protective colloids ($B_{21}$) may be employed, preferably ($B_{21}$) is at least one non-ionogenic and/or anionic protective colloid. Known substances are suitable as polymeric protective colloids ($B_{21}$), which—in contrast to the surface-active protective colloids of high hydrophilicity mentioned above under ($B_{12}$)—have the character of polymers capable of forming a protective sheath around the dispersed colloid particles. Chiefly they are polyvinylpyrrolidones, polyvinyl alcohols, copolymers of N-vinylpyrrolidone and vinyl acetate or propionate, polyethylene glycols having for example an average molecular weight in the range from 300 to 10,000 or carboxymethylcellulose.

Among the protective colloids ($B_{21}$), preference is given to the non-ionogenic ones. Advantageously a protective colloid ($B_{21}$) is used. The weight ratio of ($B_{21}$)/(A) is for example in the range from 1/100 to 200/100, preferably 2/100 to 150/100.

($B_{22}$) may be any wetting agent known per se, preferably at least one non-ionogenic or anionic wetting agent. As non-ionogenic wetting agents come generally into consideration surfactants of the abovementioned categories which, however, have a correspondingly lower HLB value or contain a correspondingly lower number of added ethyleneoxy units. As anionic wetting agents there may be mentioned e.g. mono- and dialkyl esters of sulphosuccinic acid. The anionic groups, analogously as described above for ($B_{11}$), may advantageously be present as alkali metal salts or ammonium salts.

The use of wetting agents ($B_{22}$) is possible; however, very effective dispersions can be prepared even without wetting agents. If a wetting agent is used, the weight ratio of ($B_{22}$)/(A) is e.g. $\leq 10/100$, e.g. in the range from 0/100 to 5/100.

If desired or required, solubilizers ($B_{23}$) may be used, in particular non-ionogenic solubilizers, e.g. mono-, di- or oligoethylene glycols or their mono- or di-($C_{1-4}$-alkyl) ethers or glycerol.

A solubilizer ($B_{23}$) may optionally be used, if desired. However, very good dispersions can be prepared even without solubilizer. If a solubilizer is used, the weight ratio of ($B_{23}$)/(A) is advantageously $\leq 10/100$, for example in the range from 1/100 to 8/100.

A dispersion stabilizer ($B_{24}$) may be added, if desired. By the addition of a dispersion stabilizer ($B_{24}$) the storage and transport stability of (U) may optionally also be influenced. As dispersion stabilizers ($B_{24}$) there may be employed for example polysaccharides, polysaccharide derivatives, (co) poly(meth)acrylic acids and also such thickening substances as are also useful as protective colloids, for example xanthan gum, cellulose gum, guar gum, dextrins, gum arabic, carboxymethylcellulose, acrylic-modified polysaccharides, and also the above-mentioned polyvinylpyrrolidones and/or polyvinyl alcohols or polyethylene glycols e.g. with an average molecular weight in the range from 200 to 6000. Advantageously, the acid groups, particularly the carboxylic acid groups, are at least partly present in the form of salts (so that the respective products are water-soluble), e.g. as alkali metal salts (principally sodium salts). When thickeners are used, they are advantageously used in such amounts that the viscosity of the aqueous concentrated dispersion is <1000 mPa·s, in particular at values $\leq 300$ mPa·s, preferably in the range from 50 to 200 mPa·s.

The weight ratio of the entire dispersing system (B) to (A) is for example in the range from 5/100 to 250/100, advantageously in the range from 10/100 to 150/100, preferably in the range from 50/100 to 150/100.

The dispersant system (B) serves for dispersing (A) and consists essentially of the mentioned components ($B_1$) and optionally ($B_2$), i.e. at least one surfactant ($B_{11}$) or ($B_{12}$) having dispersing properties, in which ($B_{12}$) may optionally also serve as cosurfactant to ($B_{11}$), and optionally further dispersing auxiliary substances ($B_{21}$), ($B_{22}$), ($B_{23}$) and/or ($B_{24}$).

The copolymer (C) is carboxyl-containing and crosslinked. It may be prepared in a manner conventional per se, by copolymerization of corresponding monomers which contain an ethylenic double bond, of which at least a portion are carboxyl-containing monomers and at least one portion is a crosslinking comonomer. Non-ionogenic comonomers may also have been incorporated in the polymer, if desired. The carboxyl-containing monomers are advantageously monomers which contain at least two carboxyl groups and 4 to 6 carbon atoms and are preferably used as anhydride, especially as cyclic dicarboxylic anhydride, for example itaconic acid or especially maleic acid or respectively its anhydride. The monomers or comonomers preferred for preparing (C) are in particular ($C_1$) maleic acid or maleic anhydride,
($C_2$) at least one monoethylenically unsaturated non-ionogenic comonomer and
($C_3$) a crosslinking comonomer.

As comonomers ($C_2$) are suitable in particular low molecular weight comonomers, especially alkyl methacrylates wherein alkyl advantageously contains 1 to 4 carbon atoms and preferably is methyl or ethyl, alkyl vinyl ethers wherein alkyl advantageously contains 1 to 4 carbon atoms and preferably is methyl, vinyl esters of low molecular weight aliphatic carboxylic acids, in particular of those having 2 to 4 carbon atoms, chiefly vinyl acetate, and/or vinylpyrrolidone.

As crosslinking comonomers (C) are suitable especially non-ionogenic compounds which contain at least two mutually nonconjugated ethylenic double bonds, advantageously at least two terminal double bonds, for example N,N'-methylenediacrylamide, α,ω-alkanedienes having 5 to 12 carbon atoms or divinyl ethers of α,ω-alkanediols having for example 2 to 12 carbon atoms in the alkane moiety or of polyethylene glycols, or also divinylbenzene. Of the crosslinking comonomers mentioned, the α,ω-alkanedienes are preferred.

The molar ratio ($C_1$)/($C_2$)/($C_3$) is advantageously in the range of 1/(0.2–3)/0.001–0.1), preferably 1/(0.5–1.8)/ (0.004–0.04).

The copolymers (C) are known or may be prepared analogously to known methods, expediently in the presence of a suitable initiator of free-radical polymerization [e.g. azobisisobutyronitrile, benzoyl peroxide, acetylbenzoyl peroxide, di-t.butyl peroxide, t.butyl peroxypivalate, azobis-(2,4-dimethyl-valeronitrile), for example in concentrations of 0.001 to 1%] and advantageously in the presence of a suitable aprotic solvent, for example benzene, toluene, xylene, acetone, methyl ethyl ketone, methylene chloride, cyclohexane and/or ethyl acetate; it is particularly advantageous to use a mixture of cyclohexane and ethyl acetate. The polymerization is advantageously carried out at temperatures in the range from 50 to 100° C., preferably from 60 to 80° C. The production of the polymer is advantageously carried out in such a way that crosslinking takes place at least in part intramolecularly, especially in such a way that the linear sequence of the monomers forms loops in the course of the polymerization owing to the copolymerized crosslinking monomer ($C_3$). Since the carboxyl-containing monomer, especially ($C_1$), is advantageously used in the form of the anhydride, especially maleic anhydride, the polymer (C') prepared therefrom still contains the anhydride groups. This polymer (C') may if desired, after completion of the polymerization and removal of the solvent, be hydrolysed to the carboxyl-containing polymer (C) in salt form. In a preferred procedure, this hydrolysis takes place in the presence of at least a portion of the surfactants ($B_1$).

The polymers (C') and (C) may be produced for example by the process described in U.S. Pat. No. 5,024,779; the content of this US patent is incorporated herein by reference.

The dispersions (U) of the invention may be produced by mixing (C) with the other components in aqueous medium, and preferably grinding. It is advantageous to precharge water and at least a portion of the components ($B_1$) and to add the other components thereto; the component (C) may be added before or also after the grinding and optionally even after an optional dilution with water and/or optionall addition of further components. Preferably, the component (C) is added before the component (A). In a preferred procedure, (C') is added before (A) and hydrolysed in the presence of a base (e.g. alkali metal hydroxide) so that (C) is formed therefrom in the corresponding salt form, and then the remaining components (A) and optionally further (B) and optionally formulation additives (D) are mixed in.

The weight ratio of (C)/(A) is e.g. in the range from 0.1/100 to 15/100, advantageously in the range from 0.1/100 to 5/100, preferably in the range from 0.2/100 to 2/100.

The amount of water employed is in principle freely choosable; advantageously, sufficient water is added for the dispersion to be stirrable and pourable or respectively pumpable. During grinding the amount of water present in the dispersion is advantageously such that the concentration of (A) in (U) is e.g. 2 to 50% by weight, preferably 5 to 45% by weight. More dilute dispersions are for example application liquors and stock dispersions which may optionally also contain further application-dictated additives. Concentrated to dilute dispersions may thus be produced, for example those having an (A) content in the range from 0.01 to 50% by weight. In application liquors the (A) concentrations are for example 0.01 to 20% by weight, preferably 0.05 to 1% by weight, in stock dispersions for example 0.1 to 20% by weight, preferably from 0.5 to 10% by weight, in concentrated dispersions for example 2 to 50% by weight, preferably 5 to 40% by weight. The concentrated dispersions (U) are a particular aspect of the invention.

The relative amount of the respective components and the amount of water employed are advantageously chosen so that even the concentrated dispersion (U), in particular those in which the content of (A)+(B)+(C) is advantageously in the range from 10 to 70, preferably 20 to 60% by weight, are fluent.

By the addition of suitable bases (for example of alkali metal hydroxide or carbonate and/or of an amine as described above for salt formation) or/and acids (for example of a mineral acid, such as hydrochloric acid, sulphuric acid and phosphoric acid, or of a low molecular weight aliphatic carboxylic acid, for example having 1 to 4 carbon atoms) and optionally with buffer salts, in particular phosphoric acid mono- and/or di-sodium salt and/or -potassium salt, the pH of the dispersion may be set e.g. to values in the range from 3.5 to 8.5, advantageously 3.5 to 7, preferably from 4 to 6.

Further formulation additives (D) may be used if desired, to further adapt the properties of the dispersions (U) to particular requirements or wishes concerning transport, storage and/or use. Such additives are in particular at least one of the following:

($D_1$) a defoamer ($D_2$) an agent to protect against the damaging action of microorganisms and/or ($D_3$) a dye.

Any defoamers are suitable as ($D_1$), for example paraffins or mineral oils in dispersed form, silicone defoamers, silica, ethylenebisstearamide and/or mixtures of two or more thereof. Commercially available products may be used in particular. The amounts of defoamer which can be used in the compositions of the invention, are in the ranges conventional per se and are in general dependent on the nature and amount of the surfactants. In general, very small amounts of defoamer are sufficient, e.g. ≦1% by weight based on the entire aqueous composition (U).

As components ($D_2$) are suitable in general known substances, essentially fungi- or bacteriostatic substances and/or microbicides, as are commercially available, and the concentrations used may conform to those recommended for each, for example ≦1% by weight based on the entire aqueous dispersion (U).

If as (A) there is employed ($A_2$), i.e. an optical brightener, a component ($D_3$) may also be employed. ($D_3$) is advantageously a disperse dye of the type usable in general for shading disperse brighteners. Disperse dyes are a generally known category of dyes and are known in the art and extensively described in the technical literature, for example in the Colour Index. Suitable components ($D_3$) include any disperse dyes which possess a colour suitable for shading optical brighteners, for example blue, violet and red disperse dyes. They are advantageously added in low concentrations, for example ≦0.1% by weight based on ($A_2$), as is generally sufficient in order, for example, that a yellowish, greenish or brownish shade of the substrate may be partially compensated or/and a, for example, greenish self-colour of the optical brightener, which may become evident at a certain application concentration, may be balanced out and thereby the visual impression created by the optical brightening may be improved.

The (A) content of the concentrated aqueous dispersions (U) is for example in the range from 2 to 50% by weight, advantageously 5 to 45% by weight, preferably 10 to 40% by weight. The water content of the concentrated aqueous dispersions (U) of the invention is advantageously in the range from 90 to 30%, preferably 70 to 33%, by weight:

The dispersions (U) of the invention can be produced as described above, in particular with grinding, in which case with the aid of suitable mills, for example ball mills or bead mills (glass or porcelain beads), the dispersed particles may be ground to a particle size of the desired fineness, and, if desired, a portion of the components, particularly of the water-soluble or water-thinnable components, particularly for example a protective colloid ($B_1$), a solubilizer ($B_{23}$), a component ($D_2$) and/or ($D_3$), may also not be mixed in until after the grinding. The average particle size of the dispersed particles in the dispersions (U) of the invention is advantageously in the range from 0.05 to 10 μm, preferably 0.2 to 6 μm, particularly preferably 0.4 to 4 μm. Preferably, the dispersions are filtered through a suitable sieve or a suitable filter in such a way that the dispersed particles are not larger than 20 μm, preferably not larger than 10 μm, particularly preferably not larger than 6 μm.

The aqueous dispersions (U) prepared in this manner, even the concentrated dispersions, are surprisingly stable and fluent. The concentrated dispersions have in particular a viscosity which is <1000 mPa·s; preferably, they have a viscosity in the range from 20 to 300, preferably 50 to 200, mPa·s. They may be handled, stored and/or transported and also be used directly for metered addition, so as they have been prepared. They are notable for surprisingly good stability in storage and transport.

The dispersions (U) of the invention serve for the corresponding UV-active finishing of textile material, in particular textile material which can be dyed with disperse dyes or optically brightened with disperse brighteners. Suitable textile material includes in particular textile material composed of synthetic and semisynthetic materials, chiefly of polyester, polyamides, polyurethanes and cellulose acetates, and also of fibre blends comprising such synthetic or semisynthetic materials (e.g. polyester/cotton, polyester/viscose, polyester/cotton/elastane). The textile material may be in any desirable processed state suitable for the particular application, for example in the form of loose fibres filaments, yarns, hanks, wovens, knits, carpets, ready-made and half-ready-made goods. Particular preference is given to using the dispersions (U) of the invention in the HT dyeing of yarns, which are wound on packages, especially in the form of cheeses, or in the optical brightening by the HT or thermosol processes.

The dispersions (U) of the invention are highly compatible with disperse dyes (F) and, when (A) is a UV absorber ($A_1$), are advantageously formulated together with a suitable disperse dye (F) to form an aqueous liquor which includes both the disperse dye (F) and the UV absorber ($A_1$). The disperse dye (F) may be any desired disperse dye or disperse dye mixture as are otherwise used for dyeing synthetic or semisynthetic textile material. Disperse dyes are generally known and extensively described in the technical literature, for example in the Colour Index under the heading "Disperse Dyes". Disperse dyes are generally formulated with suitable dispersants in order that they may be dispersed in the dyeing liquor; the dispersants used for this purpose are usually anionic and optionally non-ionogenic dispersants, for example such as described under ($B_1$). Disperse dyes formulated in this way customarily include 30 to 60% of dye and about 70 to 40% by weight of dispersant besides, optionally, traces of by-products.

When (A) is an optical brightener ($A_2$), generally either no dyes will be employed at all or dyes will be employed as described under ($D_3$) for shading.

The concentrations of dyes (F) in the respective liquor may vary within wide limits, depending on the substrate, the choice of dyeing method and the choice of depth of shade. The concentration of (U) in the liquor is generally dependent on the nature and the content of (A) and on the desired UV-active effect. Concentrations are employed, for example, such that the concentration of ($A_1$) based on the substrate is in the range from 0.1 to 4% by weight, preferably 0.2 to 2% by weight. The concentration of ($A_2$) based on the substrate is advantageously chosen so as to obtain a good white effect and may also vary according to substrate, application method and constitution of ($A_2$); it is for example within the range from 0.01 to 4%, advantageously 0.05 to 3%, preferably 0.1 to 2%, by weight. The liquor pH is advantageously in the distinctly acidic to nearly neutral range, for example in the pH range from 4 to 6.5, preferably 5 to 6.

The liquors may be applied to the textile material by conventional methods, for example by exhaust processes or impregnation processes, and at appropriate suitable liquor lengths and temperature conditions. For impregnation processes, the liquors may be applied to the substrate by customary methods, e.g. by padding, dipping or spraying, and the impregnated substrate, optionally after intermediate drying, may then be thermofixed at elevated temperature, e.g. in the range from 150 to 220° C., in which case a suitable fixation temperature can be chosen according to the material (for polyester e.g. from 160 to 220° C., for other synthetic fibres and for semisynthetic fibres e.g. from 150 to 180° C.). For exhaust processes short or also long liquors may be employed, e.g. liquor-to-goods ratios in the range from 2:1 to 100:1, usually 3:1 to 60:1. For HT processes and especially for the preferred treatment of cheeses, liquor-to-goods ratios of 4:1 to 40:1, in particular 5:1 to 20:1, are preferred; the temperatures may also vary as desired in the respectively suitable ranges, for example from 95 to 180° C., HT conditions being preferred, e.g. in the range from 105 to 180° C., preferably $\geq 125°$ C., e.g. in the range from 125 to 135° C.

To dye or optically brighten the cheeses, according to a preferred procedure the packages are immersed into the liquor or have the liquor poured over them and then the liquor is pumped through the cheese (from in to out or vice versa or also alternately) for the entire dyeing time. As the liquor is pumped through the package, the temperature is slowly raised, for example at a rate of 0.5 to 5° C. per minute, preferably 1 to 4° C. per minute, until the desired dyeing temperature (HT conditions) is reached, at which dyeing may be carried out e.g. for 20 to 60 minutes, and then it is brought back down slowly, for example at a rate of 1 to 10° C. per minute, preferably 2 to 6° C. per minute. The overpressure upstream of the package may be for example in the range from 0.02 to 0.5 bar, preferably 0.5 to 0.2 bar, while—using the dispersions (U) of the invention, especially the preferred ones—practically no pressure build-up takes place during the entire dyeing or brightening operation.

In the following Examples, parts are parts by weight and percentages are percentages by weight; the temperatures are reported in degrees Celsius; the disperse dyes and optical brighteners employed in the Examples are commercially available products containing about 50% of pure dye or pure brightener and about 50% of dispersant; the other additives, apart from the products of Examples 1 to 5, are commercial products. Product ($C_{31}$) employed in the Examples is a copolymer of maleic anhydride, methyl vinyl ether and 1,9-decadiene in a molar ratio of 1:1:0.0125, prepared analogously to example 1 of U.S. Pat. No. 5,024,779, which as a 0.5% aqueous suspension at pH 7.0 has an average particle size <75 μm and a rotation viscosity of 45000 to 70000 mPa·s (spindle no. 7, 20 rpm).

EXAMPLE 1

Into 219.4 parts of demineralized water are added 478.8 parts of a 29.9% aqueous solution of a condensation product of ditolyl ether sulphonate and formaldehyde, consisting of 143.2 parts of dry substance and 335.6 parts of water, 13.1 parts of the addition product of 8 mol of ethylene oxide with 1 mol of tridecyl alcohol, 2.2 parts of product ($C_{31}$) and 3.3 parts of a 30% sodium hydroxide solution, and stirred. After 60 minutes 2.2 parts of sodium dihydrogen phosphate, 1.0 part of an 85% aqueous phosphoric acid solution, 14.9 parts of the adduct of 40 mol of ethylene oxide to 1 mol of $C_{14-18}$-fatty alcohol, 12 parts of an ethylene oxide/propylene oxide block polymer (adduct of ethylene oxide and propylene oxide to polypropylene glycol, having 50% of ethyleneoxy units, and wherein the propyleneoxy fraction has a fraction-based molecular weight of 1700–2400) and 250 parts of 2-(2'-hydroxy-3'-t.butyl-5'-methyl)-5-chlorobenzotriazole are stirred in. This suspension is milled in a bead-mill with glass beads, while the pH is maintained at 5.5–6.0 by portionwise addition of 0.7 part of an 85% aqueous phosphoric acid solution. The bead milling is terminated when the particle size is <2.2 μm. After the glass beads have been separated off, 2.4 parts of a commercially available fungicide (GivGard DXN) are added and mixed in.

The resultant dispersion has a viscosity of 90 mPa·s (Brookfield DV-1) and is stable in storage.

EXAMPLE 2

A UV absorber composition is produced analogously as described in Example 1 utilizing, instead of the 250 parts of 2-(2'-hydroxy-3'-t.butyl-5'-methyl)-5-chlorobenzotriazole, 250 parts of the UV absorber of the formula

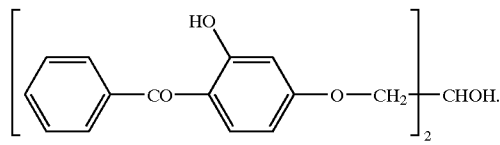

A stable dispersion is obtained.

EXAMPLE 3

A brightener composition is produced analogously as described in Example 1 utilizing, instead of the 250 parts of 2-(2'-hydroxy-3'-t.butyl-5'-methyl)-5-chlorobenzotriazole, 100 parts of the optical brightener C.I. Fluorescent Brightener 330. A stable dispersion is obtained.

EXAMPLE 4

The brightener preparation of the following composition is produced analogously to the procedure described in Example 1:

20 parts of C.I. Fluorescent Brightener 135,
3 parts of novolak polyethylene glycol ether having HLB=14
3 parts of $C_{13-16}$-alkanesulphonate
0.2 part of product ($C_{31}$)
0.4 part of a commercially available defoamer
0.2 part of fungicide (GivGard DXN) and
63.1 parts of water are bead-milled until a fine uniform suspension has formed, and are then admixed with
0.1 part of C.I. Disperse Blue 73 and
10 parts of polyethylene glycol of molecular weight=600 by stirring until a uniform dispersion has formed.

EXAMPLE 5

The brightener preparation of the following composition is produced analogously to the procedure described in Example 4:

24 parts of C.I. Fluorescent Brightener 199,
6 parts of nonylphenol decaethylene glycol ether
6 parts of polyethylene glycol of molecular weight=600
4 parts of polyvinylpyrrolidone
0.2 part of product ($C_{31}$)
0.4 part of a commercially available defoamer
0.2 part of fungicide (GivGard DXN) and
59.2 parts of water, which are milled in a bead-mill until a fine, uniform suspension has formed.

The table hereinbelow lists the percentage composition of further aqueous dispersions of the invention which are preparable similarly to Example 4. The numbers reported for each component are percentages in the respective aqueous dispersion. The products used in examples 6–33 hereinbelow are the following:

$A_{1A}$ UV absorber of the formula

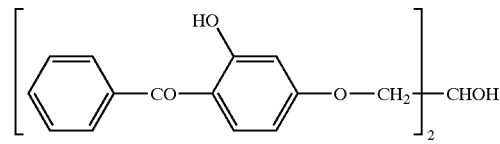

$A_{1B}$ UV absorber: 2-(2'-hydroxy-3'-t.butyl-5'-methylphenyl)-5-chlorobenzotriazole $A_{2A}$ C.I. Fluorescent Brightener 135

$A_{2B}$ C.I. Fluorescent Brightener 179

$A_{2C}$ C.I. Fluorescent Brightener 330

$A_{2D}$ C.I. Fluorescent Brightener 199

$B_{12B}$ phenolic novolak-polyethylene glycol ether methylated, with HLB 14

$C_{31}$ as defined above $B_{24A}$ copolyvinylpyrrolidone/vinyl propionate (average molecular weight $M_W$=750000)

$B_{24B}$ polyvinylpyrrolidone (average molecular weight $M_W$=30000)

$B_{24C}$ polyvinyl alcohol having residual acetyl content of 10.7% (viscosity of 4% aqueous solution at 20° C.=4 cP—according to DIN 53015)

$B_{24D}$ polyvinyl alcohol having residual acetyl content of 10.7% (viscosity of 4% aqueous solution at 20° C.=8 cP—according to DIN 53015)

$B_{11A}$ $C_{13-18}$-alkanesulphonate (sodium salt)

$B_{12A}$ addition product of 8 mol of ethylene oxide with 1 mol of isoundecanol $B_{11B}$ dialkylnaphthalenesulphonate formaldehyde condensation product (sodium salt)

$B_{21A}$ polyethylene glycol 600

$B_{21B}$ polyethylene glycol 400

$B_{23A}$ diethylene glycol $B_{23B}$ glycerol $D_{1A}$ defoamer emulsion ("Antifoam Emulsion B")

$D_{2A}$ Biocide ("GivGard DXN")

$E_A$ 30% hydrochloric acid $E_B$ phosphoric acid (85%)

In example 18, the optical brightener has been shaded with 0.5% of C.I. Disperse Blue 73

TABLE

| Ex. No. | $B_{12B}$ | $B_{11A}$ | $B_{11B}$ | $B_{12A}$ | $C_{31}$ | $B_{24A}$ | $B_{23A}$ | $B_{21A}$ | $B_{21B}$ | $B_{23B}$ | $D_{2A}$ | $D_{1A}$ |
|---|---|---|---|---|---|---|---|---|---|---|---|---|
| 6 | 3.00 | 1.00 | | 0.20 | 0.20 | 1.00 | 13.0 | | | 2.00 | 0.20 | 0.40 |
| 7 | 3.00 | 1.00 | | 0.20 | 0.20 | 1.00 | 15.0 | | | | 0.20 | 0.40 |

TABLE-continued

| | | | | | | | | | | | | |
|---|---|---|---|---|---|---|---|---|---|---|---|---|
| 8 | 4.00 | 1.30 | | 0.30 | 0.12 | | 13.0 | | | | 0.20 | 0.40 |
| 9 | 3.00 | 2.00 | | | 0.20 | | | 10.0 | | | 0.20 | 0.40 |
| 10 | 3.00 | 1.00 | | 0.30 | 0.20 | 1.00 | 13.0 | | | 2.00 | 0.20 | 0.40 |
| 11 | 3.00 | 0.70 | | | 0.20 | | | | 15.0 | | 0.20 | 0.40 |
| 12 | 5.00 | 1.00 | 1.7 | 0.30 | 0.08 | 1.50 | 15.0 | | | | 0.20 | 0.40 |
| 13 | 5.00 | 1.50 | | 0.30 | 0.12 | 1.00 | | | 15.0 | | 0.20 | 0.40 |
| 14 | 5.00 | 0.70 | | | 0.08 | | | 10.0 | | | 0.20 | 0.40 |
| 15 | 4.00 | 1.00 | 4.0 | 0.20 | 0.08 | 1.50 | | | 15.0 | | 0.20 | 0.40 |
| 16 | 1.70 | 0.40 | 1.3 | 0.20 | 0.03 | 1.50 | | | 5.0 | | 0.20 | 0.40 |
| 17 | 1.70 | 0.60 | | 0.10 | 0.05 | | | 10.0 | | | 0.20 | 0.40 |
| 18* | 1.00 | 0.30 | 1.3 | 0.05 | 0.03 | 0.60 | | | 5.0 | | 0.20 | 0.40 |
| 19 | 3.00 | 1.00 | 1.7 | 0.20 | 0.20 | 1.00 | | 10.0 | | | 0.20 | 0.40 |
| 20 | 3.00 | 1.00 | | | 0.12 | 1.00 | | 10.0 | | | 0.20 | 0.40 |
| 21 | 3.00 | 1.00 | | 0.30 | 0.12 | 1.00 | | 10.0 | | | 0.20 | 0.40 |
| 22 | 3.00 | 1.00 | | 0.20 | 0.08 | 0.50 | | 14.0 | | 1.00 | 0.20 | 0.40 |
| 23 | 5.00 | 1.70 | | 0.40 | 0.08 | 1.60 | | 14.0 | | 1.00 | 0.20 | 0.40 |
| 24 | 3.00 | 1.00 | | 0.20 | 0.20 | 1.30 | 10.0 | | | | 0.20 | 0.40 |
| 25 | 4.00 | 1.30 | | 0.20 | 0.20 | | | 10.0 | | | 0.20 | 0.40 |
| 26 | 3.00 | 1.30 | | 0.30 | 0.12 | | | | 12.0 | | 0.20 | 0.40 |
| 27 | 5.00 | 1.00 | | 0.20 | 0.12 | | 15.0 | | | | 0.20 | 0.40 |
| 28 | 5.00 | 1.00 | | 0.20 | 0.15 | 1.00 | 10.0 | | | | 0.20 | 0.40 |
| 29 | 4.00 | 1.00 | | | 0.15 | 1.30 | 15.0 | | | | 0.20 | 0.40 |
| 30 | 3.00 | 1.00 | | 0.20 | 0.12 | 0.50 | | | 15.0 | | 0.20 | 0.40 |
| 31 | 4.00 | 1.30 | | 0.30 | 0.12 | 1.00 | 15.0 | | | | 0.20 | 0.40 |
| 32 | 5.00 | 1.00 | | 0.20 | 0.08 | 1.70 | 10.0 | | | | 0.20 | 0.40 |
| 33 | 4.00 | 1.00 | | | 0.15 | | | | 17.0 | | 0.20 | 0.40 |

| Ex. No. | $B_{24C}$ | $B_{24D}$ | $B_{24B}$ | $E_A$ | $E_B$ | $A_{2A}$ | $A_{2B}$ | $A_{2C}$ | $A_{2D}$ | $A_{1A}$ | $A_{1B}$ |
|---|---|---|---|---|---|---|---|---|---|---|---|
| 6 | 4.0 | | | 0.2 | | 20.0 | | | | | |
| 7 | 4.0 | | | | 0.2 | 20.0 | | | | | |
| 8 | | | 2.0 | | 0.2 | 20.0 | | | | | |
| 9 | 6.0 | | | 0.2 | | 20.0 | | | | | |
| 10 | 4.0 | | | 0.2 | | | 20.0 | | | | |
| 11 | | 4.0 | | | 0.2 | 17.0 | 3.0 | | | | |
| 12 | | | | 0.2 | | 17.0 | 3.0 | | | | |
| 13 | | 3.0 | | 0.2 | | | | 24.0 | | | |
| 14 | 2.0 | | 3.0 | | 0.2 | | | 24.0 | | | |
| 15 | | | 2.0 | | 0.2 | | | 24.0 | | | |
| 16 | | | 2.0 | 0.1 | | | | 8.0 | | | |
| 17 | | 5.0 | | 0.1 | | | | 8.0 | | | |
| 18* | | | 2.0 | 0.1 | | | | 8.0 | | | |
| 19 | | | | 0.2 | | | | | 22.0 | | |
| 20 | | 2.0 | | | 0.2 | | | | 22.0 | | |
| 21 | | | | | 0.2 | | | | 22.0 | | |
| 22 | | | | 0.2 | | | | | | 20.0 | |
| 23 | | | | 0.2 | | | | | | 20.0 | |
| 24 | | | | 0.2 | | | | | | 20.0 | |
| 25 | | | | 0.2 | | | | | | 20.0 | |
| 26 | 5.0 | | 3.0 | 0.2 | | | | | | 20.0 | |
| 27 | | | | 0.2 | | | | | | 20.0 | |
| 28 | | 7.0 | | 0.2 | | | | | | 20.0 | |
| 29 | 7.0 | | | | 0.2 | | | | | 20.0 | |
| 30 | | | | 0.2 | | | | | | 20.0 | |
| 31 | | 3.0 | 3.0 | 0.2 | | | | | | | 24.0 |
| 32 | | | | 0.1 | | | | | | | 24.0 |
| 33 | | | 2.0 | 0.2 | | | | | | | 24.0 |

Application Example A 1000 parts of a dyeing liquor containing (based on substrate) 0.75% of the red disperse dye C.I. Disperse Red 74 and 3% of the dispersion according to Example 1 and whose pH has been adjusted to 5.0 by addition of ammonium sulphate and formic acid in a ratio of 10:1, are heated to 60° C. in an HT (high temperature) dyeing machine and 100 parts of a polyester fabric are introduced into this liquor. The dyeing autoclave is sealed and the circulating liquor is heated to 135° C. Dyeing is continued at 135° C. for 20 minutes, whereafter the liquor is cooled down to 80° C. and the dyed material is removed. It is then washed, reduction cleared, washed again and finally dried. A satisfactory, level and lightfast dyeing is obtained.

Application Example B

A small cheese of 40 g and a density of 0.41 g/cm³ (=density of package as put into the dyeing machine) is wound using a polyester yarn (dtex 167f) and a precision winder. This cheese is dyed with the below-mentioned dyes in a liquor circulation machine (for example Colorstar from Zeltex AG, Switzerland). The liquor:yarn ratio is 10:1, the water hardness is 11°dH (German degrees of hardness). The dyes used are:

0.19% of C.I. Disperse Yellow 86
0.185% of C.I. Disperse Yellow 42
0.122% of C.I. Disperse Red 91
0.05% of C.I. Disperse Blue 56
0.44% of C.I. Disperse Blue 77

3.5% of the dispersion according to Example 1 are added. The pH is 5.5 (set with formic acid/ammonium sulphate). The 40° C. liquor is poured onto the package, the liquor circulation pump is started, and the liquor, which circulates at a pressure of 2 bar, is heated from 40° C. to 70° C. at a rate of 3° C./min and then from 70° C. to 130° C. at a rate of 1° C./min. Dyeing is continued at 130° C. for 30 minutes, and the batch is then cooled down from 130 to 70° C. at a rate of 5° C./minute. This is followed by washing, reduction clearing, another wash and finally drying. During the entire dyeing time, there is no pressure build-up. The dyeing obtained is level and there are no discernible dye deposits on the dyed package or on a knit produced therefrom.

Application Example C 1000 parts of a brightening liquor containing (based on substrate) 0.2% of the brightener dispersion of Example 3 and 0.2% of the adduct of 40 mol of ethylene oxide to 1 mol of $C_{14-18}$-fatty alcohol and whose pH has been adjusted to 5.5 by addition of acetic acid are heated in an HT (high temperature) dyeing machine to 60° C. and 100 parts of a polyester fabric are introduced into this liquor. The autoclave is sealed and the circulating liquor is heated to 130° C. in the course of 35 minutes. The brightening treatment is continued at 130° C. for 30 minutes, whereupon the liquor is cooled down to 80° C., and the optically brightened material is removed. It is then washed and dried. A satisfactory optical brightening is obtained.

Application Example D 1000 parts of a brightening liquor containing (based on substrate) 0.08 to 0.6% of the brightener dispersion according to Example 3, 0.1% of the optical brightener C.I. Optical Brightener 230 and 0.2% of the adduct of 40 mol of ethylene oxide to 1 mol of $C_{14-18}$-fatty alcohol and whose pH has been adjusted to 5.5 by addition of acetic acid are heated in an HT (high temperature) dyeing machine to 60° C. and 100 parts of a polyester/viscose blend fabric are introduced into this liquor. The autoclave is sealed and the circulating liquor is heated to 120° C. at a speed of 2° C./min. The brightening treatment is continued at 120° C. for 25 minutes, whereupon the liquor is cooled down to 60° C., and the optically brightened material is removed. It is then washed and finally dried. A satisfactory optical brightening is obtained.

Application Example E

A polyester/cotton blend fabric is padded with an aqueous brightening liquor containing 0.8 to 4 g/l of the dispersion according to Example 3 and 0.2 g/l of the adduct of 6 mol of ethylene oxide to 1 mol of tridecyl alcohol at pH 5.5 (set with acetic acid) to a wet pick-up of 70% based on the weight of the dry substrate, then predried for 2 minutes at 130° C. and thermosoled for 30 minutes at 180° C. By this the polyester portion of the blend fabric is satisfactorily optically brightened.

The cotton portion can then, in a second process step, in a manner conventional per se, under alkaline conditions, be simultaneously optically brightened with an optical brightener of the bistriazinylamino-stilbenedisulphonic acid series and bleached with hydrogen peroxide in the presence of a peroxide bleach liquor stabilizer (wet pick-up 70%, 90 minutes' hot dwell at 95° C., then hot and cold rinse and finally drying).

A satisfactory optical brightening is obtained.

In an analogous way the compositions according to each of Examples 2 or 22 to 33 are employed in each of Application Examples A and B instead of the composition according to Example 3. Satisfactory dyeings are obtained.

In an analogous way the compositions according to each of Examples 4 to 21 are employed in each of Application Examples C, D and E instead of the composition according to Example 1. Satisfactory optical brightenings are obtained.

What is claimed is:

1. A process for finishing a textile material by treating said textile material with an aqueous dispersion (U) comprising the steps of:
   1) providing an aqueous dispersion (U) comprising:
      (A) a UV-absorbing textile treatment agent, where (A) is
         ($A_1$) a UV absorber, or
         ($A_2$) an optical brightener,
      (B) a dispersant system, where B comprises
         ($B_1$) a surfactant selected from the group consisting of: anionic dispersants, nonionic dispersants, emulsifiers and combinations thereof, and/or
         ($B_2$) at least one dispersing auxiliary comprising: protective colloids, wetting agents, solubilizers and/or dispersion stabilizers, and
      (C) a carboxyl-containing crosslinked copolymer, where (C) is a copolymer of:
         ($C_1$) maleic acid or maleic anhydride,
         ($C_2$) at least one monoethylenically unsaturated nonionic comonomer, and
         ($C_3$) a crosslinking comonomer
   2) providing a textile material, and
   3) contacting said aqueous dispersion (U) with said textile material.

2. The process for finishing textile material according to claim 1, where said aqueous dispersion (U) additionally comprises:
   (D) at least one formulation additive, where (D) is selected from the group consisting of:
      ($D_1$) a defoamer,
      ($D_2$) a biocide,
      ($D_3$) a dye or combinations thereof.

3. The process for finishing textile material according to claim 1, where in aqueous dispersion (U) (C) is mixed with the other components of the dispersion in an aqueous medium.

4. The process for finishing textile material according to claim 1, where a polymer (C') which is a polymer which corresponds to the constitution of (C) but wherein the carboxyl-containing monomer is a dicarboxylic acid which is present in the form of cyclic anhydride, and this is hydrolysed in the presence of at least a portion of the components (B) and in the presence of a base to form (C) in salt form and then (A) and optionally the remaining components of (U) are added.

5. A process for treating textile material in an aqueous liquor comprising the steps of:
   providing a textile material;
   providing an aqueous liquor;
   adding the aqueous dispersion (U) according to claim 1 to said aqueous liquor; and
   contacting said textile material with said aqueous liquor.

6. The process for treating textile material in an aqueous liquor according to claim 5 where (A) is a UV absorber ($A_1$) and where said textile material is in the form of cheeses.

7. The process for treating textile material in an aqueous liquor according to claim 5 where (A) is an optical brightener ($A_2$) and where said textile material is in the form of cheeses.

8. The process for treating textile material in an aqueous liquor according to claim 5 where said textile materials are synthetic or cellulosic textile material.

9. A process for finishing textile material with a UV-absorbing textile treatment agent (A), where the UV-absorbing textile treatment agent (A) is used in the form of a dispersion (U) according to claim 1.

10. A process according to claim 1 for finishing synthetic or cellulosic fibre material in the form of yarn on cheeses.

11. The process for finishing textile material according to claim 1, where the crosslinking comonomer ($C_3$) is an $\alpha,\omega$-alkanediene.

* * * * *